(12) United States Patent
McCay (10) Patent No.: US 6,283,276 B1
(45) Date of Patent: Sep. 4, 2001

(54) OVERHEAD PUSHER FINGER GUIDE SYSTEM

(75) Inventor: Steve W. McCay, Raleigh, NC (US)

(73) Assignee: Bell & Howell Mail and Messaging Technologies Company, Durham, NC (US)

( * ) Notice: Subject to any disclaimer, the term of this patent is extended or adjusted under 35 U.S.C. 154(b) by 0 days.

(21) Appl. No.: 09/292,212

(22) Filed: Apr. 15, 1999

(51) Int. Cl.[7] .................................................. B65G 19/00

(52) U.S. Cl. ......................... 198/729; 198/733; 198/734; 271/198

(58) Field of Search .................................. 198/727, 644, 198/729, 734, 733; 271/198

(56) References Cited

U.S. PATENT DOCUMENTS

| | | | | |
|---|---|---|---|---|
| 1,589,059 | * | 6/1926 | Fink et al. ............................. | 198/733 |
| 2,319,281 | * | 5/1943 | Winters ................................. | 198/733 |
| 2,536,575 | * | 1/1951 | Seldin .................................... | 198/729 |
| 2,559,819 | * | 7/1951 | Hettinger .............................. | 198/734 |
| 2,946,427 | * | 7/1960 | Friedman .............................. | 198/729 |
| 3,408,926 | * | 11/1968 | Rogerson ............................. | 198/733 |
| 4,051,948 | * | 10/1977 | Sackett .................................. | 198/727 |
| 5,806,659 | * | 9/1998 | Middelburg et al. ................. | 198/733 |

* cited by examiner

Primary Examiner—Joseph E. Valenza
(74) Attorney, Agent, or Firm—Jenkins & Wilson, P.A.

(57) ABSTRACT

The invention is directed to an overhead pusher finger guide system, preferably for use with a sheet handling apparatus. The guide system prevents the lower conveyor run from sagging or otherwise moving out of the proper feed plane. Accordingly, superior sheet handling is achieved.

12 Claims, 4 Drawing Sheets

OVERHEAD PUSHER FINGER GUIDE SYSTEM

TECHNICAL FIELD

The present invention relates generally to apparatuses and methods for conveying and pushing sheets, and more particularly to an overhead pusher finger guide for pushing sheets.

BACKGROUND OF THE INVENTION

The use of chain or belt mounted pusher elements is well known in the art of paper handling. Such pushers are used to push a sheet or group of sheets from the rear and down a sheet path. Typically, two side-by-side pushers are used so that the sheets or group of sheets will be fed down the sheet path without imparting any skew thereon.

Because the sheets are moved down the sheet path after being subject to a large acceleration and at a high speed, accurate sheet movement and placement becomes more critical. However, mechanical limitations on the various elements that make up the pusher element conveyor system may detract from such accurate sheet movement and placement.

Accordingly, there is room for improvement within the art.

OBJECTS OF THE INVENTION

It is an object of the present invention to provide an overhead pusher finger guide that causes sheets to be fed down a sheet path with less opportunity for sheet skew to be introduced.

It is a further object of the present invention to provide an overhead pusher finger guide that causes sheets to be fed down a sheet path with less opportunity for sheet skew to be introduced by controlling the degrees of freedom of movement allowed on the pusher.

These and other objects of the present invention are achieved by a conveyor assembly, comprising: at least first and second spaced apart sprockets; an endless conveyor spanning between the at least first and second sprockets; at least one pusher element fixed to the endless conveyor; and a guide member, the guide member guiding the at least one pusher element along a predetermined path.

DETAILED DESCRIPTION OF THE DRAWINGS

With reference to the attached drawings an overhead pusher finger guide system will now be described with respect to an exemplary and non-limiting preferred embodiment.

Figure 1:
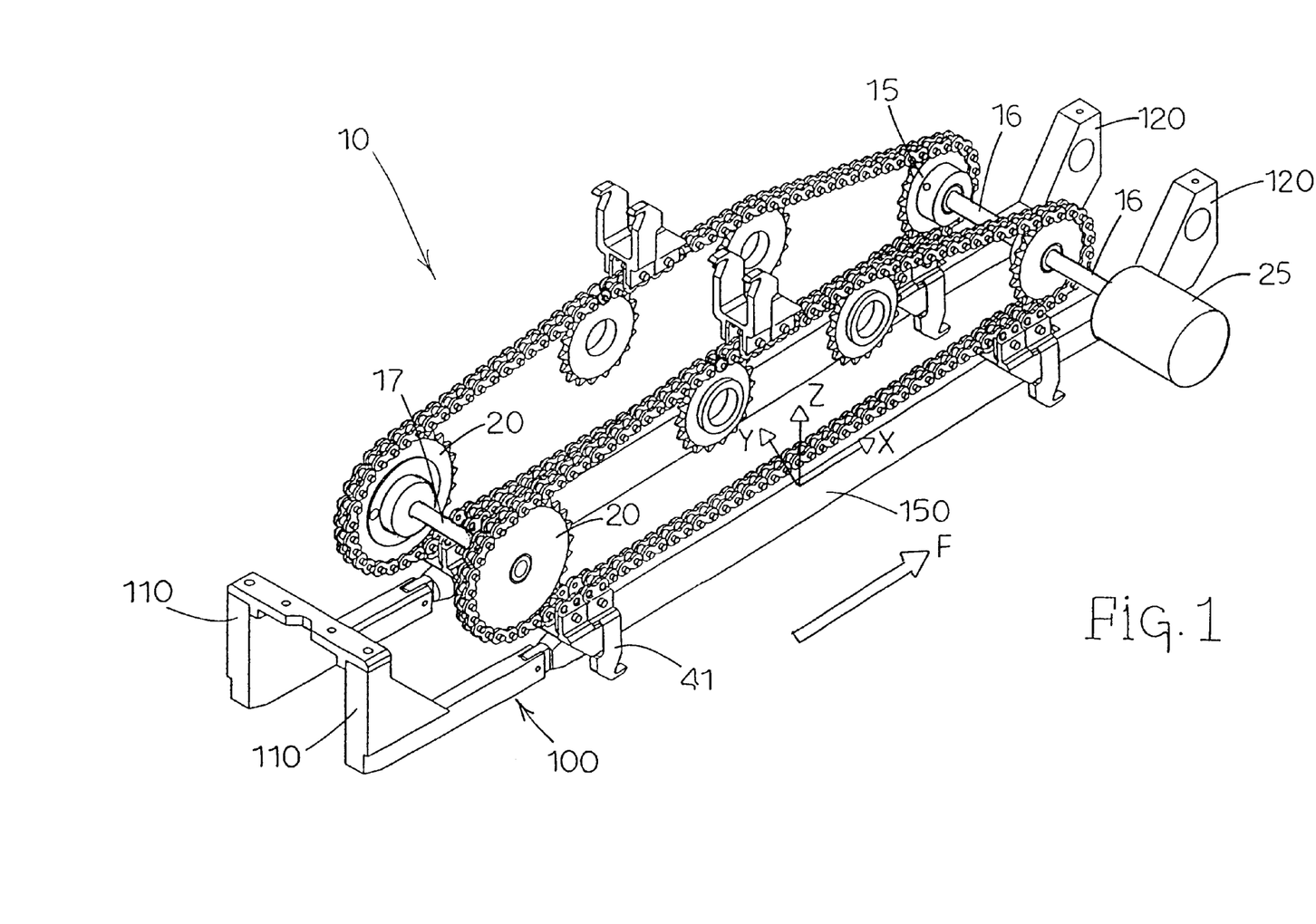
FIG. 1 of the drawings is a perspective view of an overhead pusher guide assembly according to the present invention.
Figure 2:
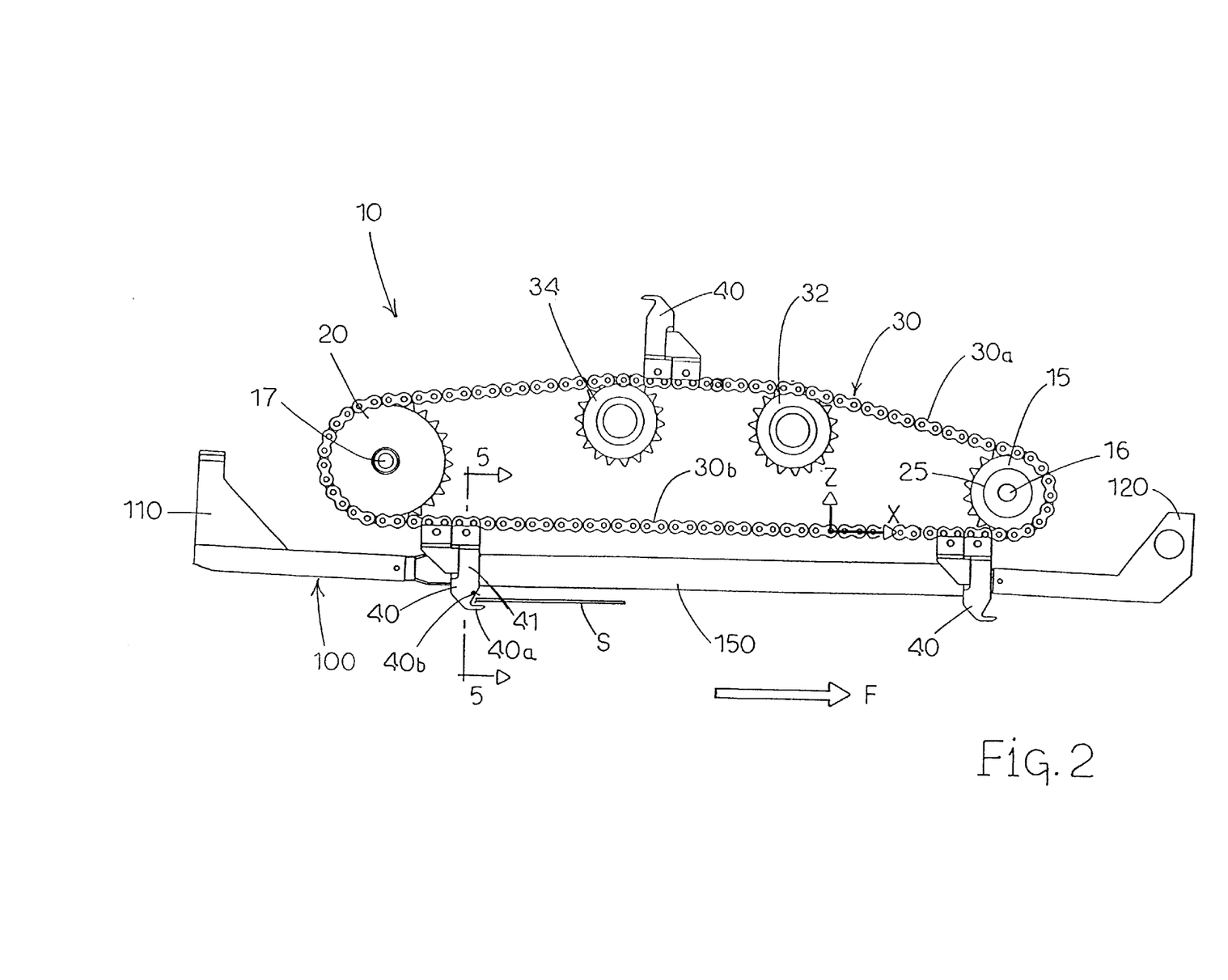
FIG. 2 of the drawings is an elevation view of an overhead pusher guide assembly according to the present invention.
Figure 3:
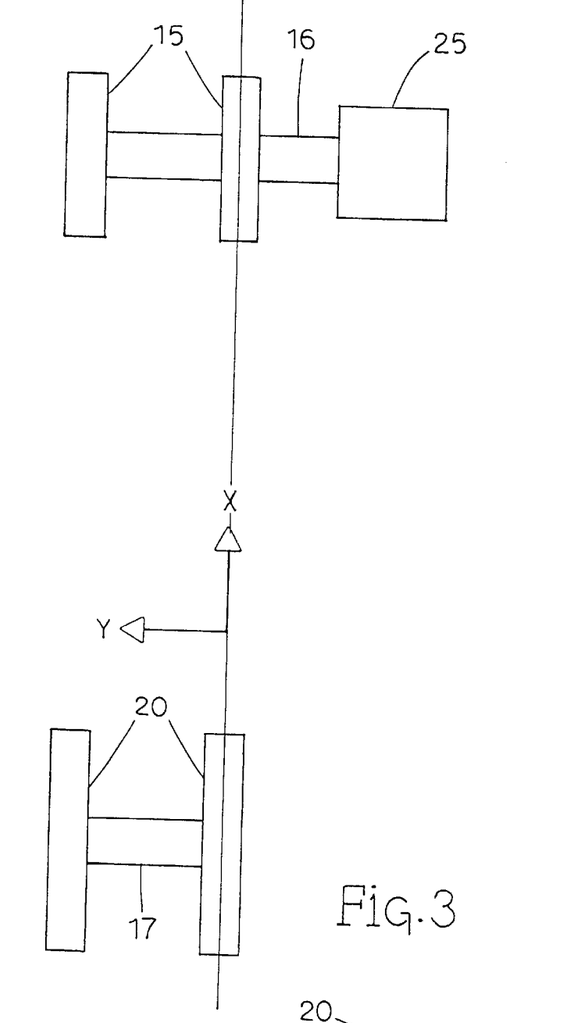
FIG. 3 of the drawings is a plan view of an overhead pusher guide assembly according to the present invention and depicting the coincidence of sprocket centerlines.
Figure 4:
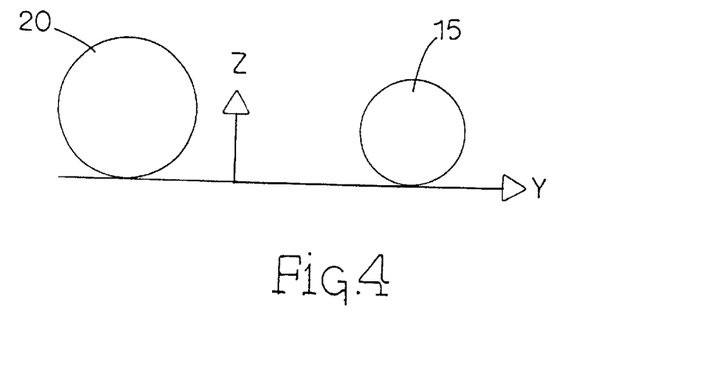
FIG. 4 of the drawings is a simplified elevation view of an overhead pusher guide assembly according to the present invention and depicting the alignment of the two sprockets.

Overhead conveyor 10 is depicted in FIGS. 1, 2. First and second circular drive members, in the preferred form of sprockets 15, 20, are mounted on rotatable drive shafts 16, 17, respectively. As shown in FIG. 3, the centerline of each sprocket 15, 20, lies along a common line C that extends along the X (horizontal) axis. Furthermore, as shown in FIG. 4, sprockets 15, 20 are positioned such that the X axis is tangent to the lowermost point of each of sprockets 15, 20 and, therefore, the lowermost point of each of sprockets 15, 20, lie along the same point of the Z (vertical) axis.

One of drive shafts 16, 17 is connected to drive motor 25. Endless conveyor chain 30 is wrapped around the teeth of sprockets 15, 20 and will comprise upper conveyor chain run 30a and lower conveyor chain run 30b. Slack in upper conveyor chain run 30a is prevented by use of one or more idler sprockets 32, 34. Due to the positioning of sprockets 15, 20, described above, lower conveyor chain run 30b, in ideal conditions, will be parallel to the X axis, which itself is parallel to the downstream paper feed direction F, as will described further below.

A plurality of pusher elements 40 are attached to conveyor chains 30 at a fixed spaced-apart distance. Each pusher element has a lower portion 40a for supporting the bottom of a sheet(s) S and an indented portion 40b for receiving the rear portion of sheet(s) S and pushing the same in paper feed direction F.

In the preferred embodiment, overhead conveyor 10 is an endless chain-based conveyor and therefore the circular drive members comprise sprockets. However, it is equally acceptable for overhead conveyor 10 to be an endless belt-based conveyor, in which case, the circular drive members would comprise pulleys.

Under optimal and ideal conditions, lower conveyor chain run 30b is parallel to the X axis and the paper feed direction F. However, for various reasons, optimal and ideal conditions are not always present. For example, due to gravity, lower run 30b will sag in the vertical direction. Assuming the X axis is coincident with an ideal lower run 30b, if lower run 30b sags, it is deflected in the −Z direction. The sagging may be overcome by increasing the force applied to idlers 32, 34, but this may also lead to a bound-up drive system and is therefore not a viable solution to the sagging chain problem.

Additionally, lower run 30b may move or oscillate along the Y (transverse) axis due to mechanical forces. Such movement would then be imparted on pushers 40 and onto sheet(s) S. These forces would also result in all kinds of paper mis-feed problems.

Accordingly, to eliminate this problem by controlling the degrees of freedom of movement allowed of pusher 40, a guide 100 is provided for assuring pusher element 40 moves only in the X direction with no deflection in the Y or −Z directions.

Guide 100 comprises overhead support bracket members 110, 120 that are mounted to the body of the sheet feeder (not shown) over the sheet feed plane. Between support bracket members 110, 120 and supported thereby is guiding element 150, which in the preferred embodiment is of circular cross-section for reasons to be described below. Guiding element 150 is parallel to the X axis and paper feed direction F.

Figure 5:
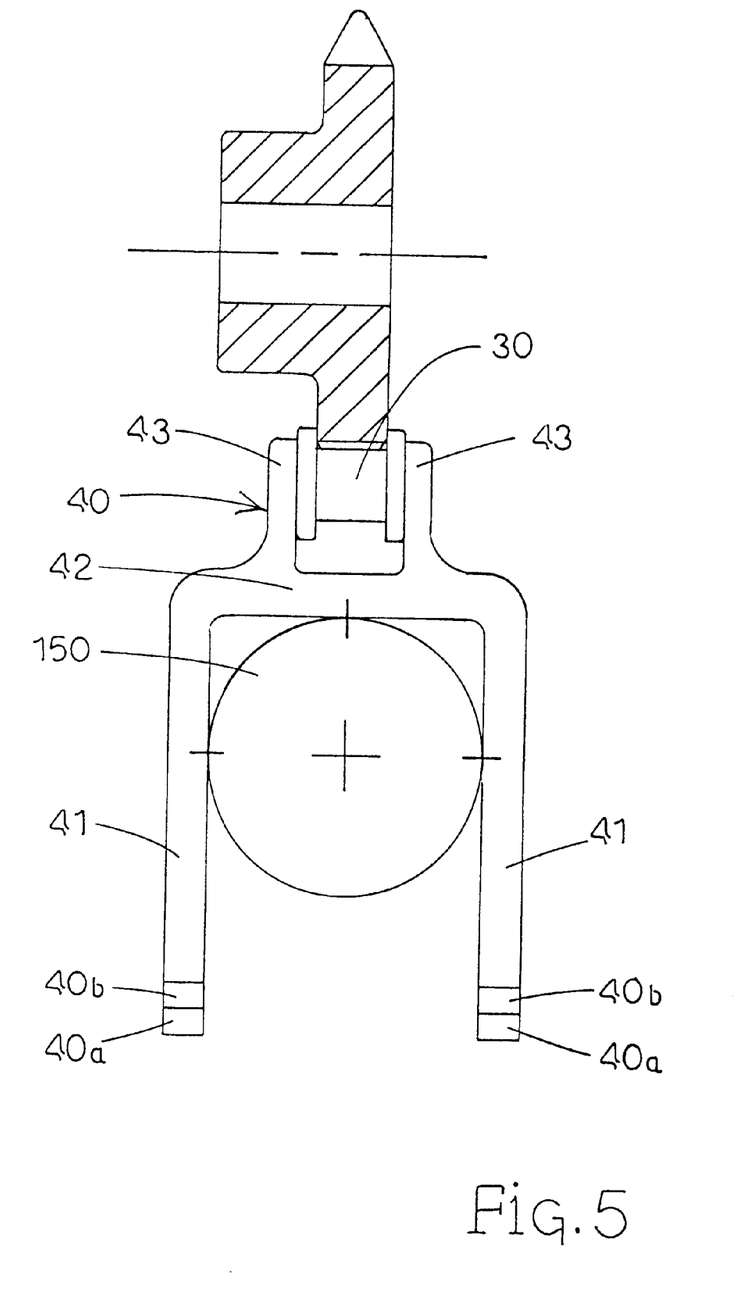
FIG. 5 of the drawings is a sectional view along line 5—5 of FIG. 2.

In the past, pusher element 40 was able to take any of many different configurations. However, for use with guide 150 according to the instant invention, a preferred pusher element 40 shape is required. In particular, as shown in FIG. 5, pusher element 40 comprises a generally H-shaped element having two downwardly directed walls 41, a horizontal cross-wall 42, and two upwardly directed walls 43. The upwardly directed walls 43 attach pusher element 40 to endless conveyor chain 30 via rivets or any other conventional mechanical fastener. Downwardly directed walls 41 are spaced apart by an amount just slightly greater than the diameter of guide element 150.

Having described the overall structure of overhead pusher finger guide system 10 according to the invention, its operation will now be described.

When the sheet feeding machine (not shown) is started, motor 25 will receive a control signal and start to operate. Through drive shaft 16, sprockets 15 will begin to rotate in the counter-clockwise directions, when configured as shown in FIG. 2. The rotation of sprockets 15 will result in the rotation of sprockets 20 and endless conveyor chain 30. Since guide elements 40 are rigidly fixed to endless conveyor chain 30, they too will be moved in the counter-clockwise direction.

At the beginning of a feed cycle for an incoming sheet S, the following steps will occur:

1. Pusher element 40 starts to pass downwardly around sprocket 20;
2. As pusher element 40 moves through the bottom half of sprocket 20, it approaches guide element 150 of guide 100;
3. Downwardly directed walls 41 of pusher element 40 start to receive therebetween guide element 150, which just contacts downwardly directed walls 41;
4. Downwardly directed walls 41 of pusher element 40 continue to receive therebetween guide element 150 until horizontal cross wall 42 of pusher element 40 comes into contact with the top of guide element 150;
5. At point D, pusher element 40 has now completed its pass around sprocket 20 and is now fully in lower run 30b of endless conveyor chain 30;
6. A sheet S is contacted by indented portion 40b of pusher element 40;
7. Sheet S is pushed in direction X and paper feed direction F;
8. Sheet S is released to a downstream operation (not shown);
9. Pusher element 40 begins to move upwardly around sprocket 15;
10. Downwardly directed walls 41 of pusher element 40 begin to move away from guide element 150 and horizontal cross wall 42 of pusher element 40 comes out of contact with the top of guide element 150;
11. Pusher element 40 becomes totally distant from guide element 150 and approaches upper run 30a; and
12. The above steps are repeated for each sheet S fed.

It can be seen that the guide element 150 according to the invention assures that pusher element 40 is maintained along the proper path for its entire cycle when along lower run portion 30b. This causes sheets that are fed down a sheet path with less opportunity for sheet skew to be introduced.

While idler rollers are another possible solution to the sagging problem, they are unable to eliminate sag along the entire lower conveyor chain run 30b.

As described herein, it is preferred that guide element 150 take on a cylindrical shape. This is preferred, but not required. It is preferred because the three tangent points at which guide element 150 come into contact with walls 41, 42 represent less opportunity for frictional forces to become a factor in machine operation. If guide element 150 was rectangular in cross-section and its walls came into contact with all of walls 41, 42, large frictional forces would be introduced that would have to be overcome by motor 25. Typically, the forces will only be overcome by the use of a larger, more expensive motor 25.

The above description is given with reference to an overhead pusher finger guide system. However, it will be understood that various details of the invention may be changed without departing from the scope of the invention. Furthermore, the foregoing description is for purpose of illustration only, and not for purpose of limitation, as the invention is defined by the following, appended claims.

That which is claimed:

1. A conveyor assembly, comprising:
   (a) at least first and second spaced apart sprockets;
   (b) an endless conveyor spanning between said at least first and second sprockets;
   (c) at least one pusher element fixed to said endless conveyor;
   (d) a guide member, said guide member guiding said at least one pusher element along a predetermined path;
   (e) wherein said predetermined path comprises a horizontal path lying in the plane of the center cross-sections of said sprockets;
   (f) wherein said pusher element has at least one vertical wall having a vertical surface and a horizontal wall having a horizontal surface and said guide member contacts said horizontal and vertical surfaces; and
   (g) wherein said guide member contacts said horizontal and vertical surfaces at one point on each.

2. The conveyor assembly according to claim 1, wherein said guide members are circular and said horizontal and vertical surfaces of said guide member are tangent to said circular guide members.

3. A conveyor assembly for feeding a sheet along a predetermined sheet path, comprising:
   (a) first and second sprockets, said sprockets spaced apart in the direction of the sheet path;
   (b) an endless conveyor spanning said sprockets and having upper and lower run portions;
   (c) at least one pusher element fixed to said endless conveyor;
   (d) a guide element, said guide element preventing said lower conveyor run from sagging or being deflected in the transverse direction to said sheet path;
   (e) wherein said pusher element has two substantially vertical walls and one horizontal wall and an empty space between said horizontal and vertical walls;
   (f) wherein said guide element is positioned below said lower conveyor run and parallel thereto;
   (g) wherein during a feed cycle, said conveyor causes said pusher element span to travel inverted along said upper run, around said first sprocket, and then along said lower run; and
   (h) wherein as said pusher element transitions from spanning around said first sprocket to along said lower run, said guide element is received within said empty space of said pusher element and comes into contact with inner surfaces of said horizontal and vertical walls.

4. The apparatus according to claim 3, wherein said guide element is circular and said contact is tangential contact.

5. The apparatus according to claim 4, wherein said circular guide element is parallel with said predetermined sheet path.

6. A conveyor assembly, comprising:

(a) at least first and second spaced apart sprockets;

(b) an endless conveyor spanning between said at least first and second sprockets;

(c) at least one pusher element fixed to said endless conveyor;

(d) a guide member, said guide member guiding said at least one pusher element along a predetermined path;

(e) wherein said pusher element has at least one vertical wall having a vertical surface and a horizontal wall having a horizontal surface and said guide member contacts said horizontal and vertical surfaces; and (f) wherein said guide member contacts said horizontal and vertical surfaces at one point on each.

7. A conveyor assembly for conveying media sheets, comprising:

(a) at least first and second spaced apart sprockets;

(b) an endless conveyor spanning between said at least first and second sprockets;

(c) at least one pusher element for conveying media sheets fixed to said endless conveyor;

(d) a guide member, said guide member guiding said at least one pusher element along a predetermined path;

(e) wherein said predetermined path comprises a horizontal path lying in the plane of the center cross-sections of said sprockets; and (f) wherein said pusher element has at least one vertical wall having a vertical surface and a horizontal wall having a horizontal surface and said guide member contacts said horizontal and vertical surfaces.

8. The conveyor assembly according to claim 7, wherein said guide member contacts said horizontal and vertical surfaces at one point on each.

9. The conveyor assembly according to claim 8, wherein said guide members are circular and said horizontal and vertical surfaces of said guide member are tangent to said circular guide members.

10. A conveyor assembly for feeding a media sheet along a predetermined sheet path, comprising:

(a) first and second sprockets, said sprockets spaced apart in the direction of the sheet path;

(b) an endless conveyor spanning said sprockets and having upper and lower run portions;

(c) at least one pusher element for conveying media sheets fixed to said endless conveyor;

(d) a guide element, said guide element preventing said lower conveyor run from sagging or being deflected in the transverse direction to said sheet path;

(e) wherein said pusher element has two substantially vertical walls and one horizontal wall and an empty space between said horizontal and vertical walls;

(f) wherein said guide element is positioned below said lower conveyor run and parallel thereto;

(g) wherein during a feed cycle, said conveyor causes said pusher element span to travel inverted along said upper run, around said first sprocket, and then along said lower run; and (h) wherein as said pusher element transitions from spanning around said first sprocket to along said lower run, said guide element is received within said empty space of said pusher element and comes into contact with inner surfaces of said horizontal and vertical walls.

11. The apparatus according to claim 10, wherein said guide element is circular and said contact is tangential contact.

12. The apparatus according to claim 11, wherein said circular guide element is parallel with said predetermined sheet path.

* * * * *

UNITED STATES PATENT AND TRADEMARK OFFICE
CERTIFICATE OF CORRECTION

PATENT NO.   : 6,283,276 B1
DATED        : September 4, 2001
INVENTOR(S)  : Steve W. McCay It is certified that error appears in the above-identified patent and that said Letters Patent is hereby corrected as shown below:

Drawings,
Figure 2, the drawing has been edited to more specifically show point "D" as described on page 6, line 21.
Figure 4, the drawing has been edited to correctly show the direction "X" which was originally incorrectly labeled as "Y".

Signed and Sealed this

Ninth Day of April, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.   : 6,283,276 B1
DATED        : September 4, 2001
INVENTOR(S)  : Steve W. McCay It is certified that error appears in the above-identified patent and that said Letters Patent is hereby corrected as shown below:

<u>Drawings,</u>
Figure 2, the drawing has been edited to more specifically show point "D" as described on page 6, line 21.
Figure 4, the drawing has been edited to correctly show the direction "X" which was originally incorrectly labeled as "Y".

This certificate supersedes Certificate of Correction issued April 9, 2002

Signed and Sealed this

Thirteenth Day of August, 2002

*Attest:*

*Attesting Officer*

JAMES E. ROGAN
*Director of the United States Patent and Trademark Office*